United States Patent [19]

Schnitzer

[11] 4,287,857
[45] Sep. 8, 1981

[54] BURNER-BOILER COMBINATION AND AN IMPROVED BURNER CONSTRUCTION THEREFOR

[76] Inventor: Leo Schnitzer, 22 Burr Farms Rd., Westport, Conn. 06880

[21] Appl. No.: 74,494

[22] Filed: Sep. 11, 1979

[51] Int. Cl.³ .......................................... F22B 31/00
[52] U.S. Cl. ..................................... 122/23; 122/10; 122/14; 431/116; 431/9; 431/10
[58] Field of Search .................... 431/115, 116, 10, 9, 431/8; 122/4 R, 23, 10, 14

[56] References Cited

U.S. PATENT DOCUMENTS

| | | | |
|---|---|---|---|
| 3,361,183 | 1/1968 | Reichhelm | 431/116 |
| 3,705,784 | 12/1972 | Reichhelm et al. | 431/116 |
| 3,741,166 | 6/1973 | Bailey | 431/116 X |
| 3,980,422 | 9/1976 | Dennis | 431/116 |
| 3,990,831 | 11/1976 | Syska | 431/116 X |
| 4,130,388 | 12/1978 | Flanagan | 431/116 |

*Primary Examiner*—Edward G. Favors
*Attorney, Agent, or Firm*—Arthur T. Fattibene

[57] ABSTRACT

A compact burner-boiler combination having an improved heating cycle for effecting substantial fuel saving and maximum boiler and combustion efficiency in a relatively simple and expedient manner. This is attained by a compact boiler construction utilizing an improved burner construction and method of combustion in which a liquid fuel is gasified by the heating products of combustion to form a homogeneous fuel gas-air mixture prior to combustion so as to effect a substantially stoichiometric burning of the fuel so as to result in a high velocity and a very high flame temperature (approx. 4100° F.) and to cause the breakdown of a portion of the hydrocarbons into their basic component elements so as to make them available for diffusion burning. A small percentage or air is thereafter introduced tangentially into the burner flame to create the diffusion burning of the free hydrogen and carbon generated by the combustion process to produce a hot luminous optimum flame pattern and to maintain the high surface velocity so as to attain maximum transfer of heat energy to the heat transfer surfaces of the boiler by both radiation and conduction.

20 Claims, 8 Drawing Figures

FIG. 6

BURNER-BOILER COMBINATION AND AN IMPROVED BURNER CONSTRUCTION THEREFOR

PRIOR ART

Heretofore boilers and burners designed to fire such boilers have been fired by a liquid and/or gaseous fuel in a manner which required a considerable period of time to reach the desired operating cycle of the boiler. Operating cycle as herein used is defined as the amount of time that the burner is required to be fired versus the amount of time the burner is off so as to generate a specific or desired amount of B.T.U.'s necessary to heat up the boiler water and to generate steam; and/or hot water output. As a result of this long cycling time, a considerable amount of fuel is required to be consumed each time the boiler is cycled. Because of the ever increasing cost of fuel, the operating cost for such boilers is becoming ever critical.

Another problem existant in boilers, particularly those which are oil fired, is the accummulation of soot or carbon which inherently form on the walls of the heat transfer surfaces and which will seriously reduce the efficiency of the boiler. For this reason the conventionally known oil fired boilers require frequent cleaning in order to maintain peak operating efficiency.

It has been noted that with the conventionally known firing means or available burners, that a relative large amount of heat transfer surfaces is required to obtain a given output or efficiency. For example, a rated 40 H.P. boiler firing by conventionally known oil atomizing burners or gas burners require approximately from 200 to 400 square feet of heat transfer surfaces. For this reason the initial capital expense or cost of the boiler is greater than is necessary in view of the invention to be herein described.

OBJECTS

It is an object of this invention to provide a compact burner-boiler combination in which the cycle time of the unit can be reduced to a minimum so as to obtain maximum fuel economy.

Another object is to provide a burner-boiler combination in which the maximum thermal efficiency of the unit can be maintained throughout the operating life of the unit.

Another object is to provide a burner-boiler combination in which a minimum amount of heat transfer surfaces is required for any given rated output of the boiler.

Another object is to provide a compact oil-fired burner-boiler combination which requires very little if any cleaning of the heat transfer surfaces.

Another object is to provide an improved combination gas and/or oil fired burner in which the liquid fuel is gasified prior to combustion.

Another object is to provide an improved burner construction in which the noxious polutants resulting from the combustion process are reduced to a minimum.

Another object is to provide an improved oil gasification burner in which a hot luminous flame and high velocity pattern can be controlled so as to effect maximum transfer of radiant and conductive heat energy to a heat transfer surface.

Another object is to provide an improved burner construction which is capable of effecting the diffused burning of the free hydrogen and carbon generated during the combustion process so as to produce a hot luminous flame and high velocity necessary to effect maximum heat transfer by radiation and conduction and thereby enable the amount of heat transfer surfaces required for a given application to be reduced to a minimum.

Another object is to provide an improved liquid fuel gasifying burner whereby the start time interval for effecting the initial gasification of the liquid fuel necessary to effect the operation of the burner is reduced to a minimum.

Another object is to provide a method of combustion in which liquid fuel is gasified and mixed with air to form a gaseous fuel-air combustible mixture; and thereafter burned under pressure to produce a very hot flame so as to cause a breakdown of the hydrocarbons into their basic component elements which are subsequently consumed by diffusion burning by the addition of a small percentage of air.

Another object is to provide a improved liquid fuel gasifying burner for producing a burner flame having a very high flame temperature and high velocity and effecting the diffusion burning of the free hydrogen and carbon while maintaining the high velocity.

BRIEF SUMMARY OF THE INVENTION

The foregoing objects and other features and advantages of this invention are attained by a compact boiler and burner combination which comprises a boiler configuration having a minimum of heat transfer surfaces compatible to an improved liquid fuel gasification burner which is effective to reduce the cycling time of the overall unit to a minimum thereby resulting in a considerable fuel saving. This is attained by a burner construction having a burner nozzle and connected mixing chamber in which combustion air is introduced at a high velocity to create a negative or reduced pressure therein. A gas return port is located adjacent to the outlet of the burner nozzle which is connected by a return tube to the mixing chamber. The arrangement is such that the flow of combustion air through the mixing chamber will induce a flow of combustion gases through the gas return port and connected return tube to the mixing chamber. Liquid fuel is introduced into the return tube which functions as a gasification chamber wherein the hot gases of combustion effect the gasification of the liquid fuel prior to mixing with the combustion air in the mixing chamber to form a generally stoichiometric homogenous gas-air combustible mixture prior to combustion.

Ignition is effected by an igniter or ignition burner disposed at an angle to the axis of the burner nozzle and directed toward the gas return port so that the combustion gases of the igniter burner are utilized to initiate the gasification of the liquid fuel being introduced into the gas return tube.

To effect diffusion burning and to control the flame pattern so as to retain the high surface velocity, a series of ports are disposed about the outlet of the burner nozzle to introduce tangential air about the burner flame. The amount of air introduced is under 3% and merely sufficient to effect diffusion burning of the free hydrogen and carbon in the flame so as to generate an intense hot luminous flame so as to optimize the radiant and conductive transfer of the generated heat to the boiler heat transfer surfaces. The air for effecting this flame control is bled off the main air supply used for combustion.

The burner is also provided with a gas fuel inlet for introducing a natural gas fuel into the mixing chamber when the burner is desired to be operated on a gaseous fuel.

In combination with a boiler, the burner nozzle is disposed in fluid tight sealing relationship with the fire tube or combustion chamber of the boiler. Also, the boiler is provided with heat transfer surfaces arranged to define a multiple flow path for the heating gases of combustion so as to optimize the heat transfer, initially by both radiant and conductive heat transfer and by conduction thereafter.

FEATURES

A feature of this invention resides in the provision of a burner-boiler combination having a liquid fuel gasification burner with a flame velocity and diffusion control arrangement for effecting an intense hot luminous flame so as to provide an optimum transfer of heat to the heat transfer surfaces of the boiler.

Another feature resides in the provision of an improved burner-boiler combination in which the proportion of boiler heating surfaces to burner output is reduced to a minimum so as to obtain a minimum cycle time for a given boiler size or rating.

Another feature resides in an improved liquid fuel gasification burner in which an igniting burner is disposed in particular alignment with respect to the gas return port so as to enhance the initial gasification of the liquid fuel.

Another feature resides in an improved liquid fuel gasification burner in which a plurality of ports are spaced about the outlet of the burner nozzle to introduce tangential air about the burner flame to control flame velocity patterns and to effect diffusion burning of the free hydrogen and carbon to thereby generate an intense luminous flame so as to optimize heat transfer by radiation and conduction.

Other features and advantages will become more apparent when considered in view of the drawings and specifications in which.

DETAIL SPECIFICATION

Figure 1:
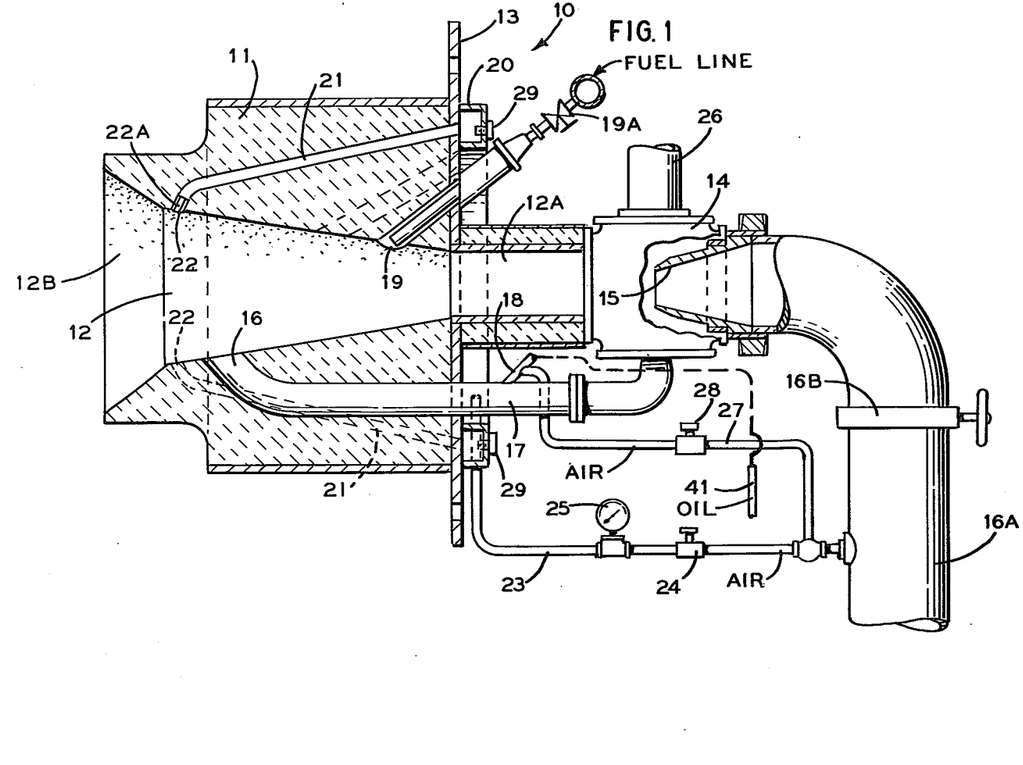
FIG. 1 is a partial sectional size view of a burner construction embodying the invention taken along line 1—1 on FIG. 2.
Figure 2:
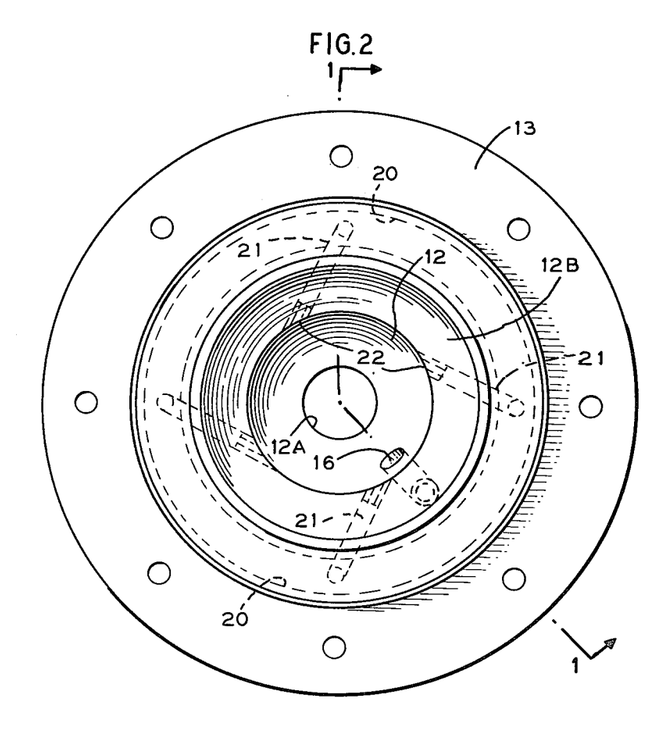
FIG. 2 is a front end view of the burner construction of FIG. 1.
Figure 3:
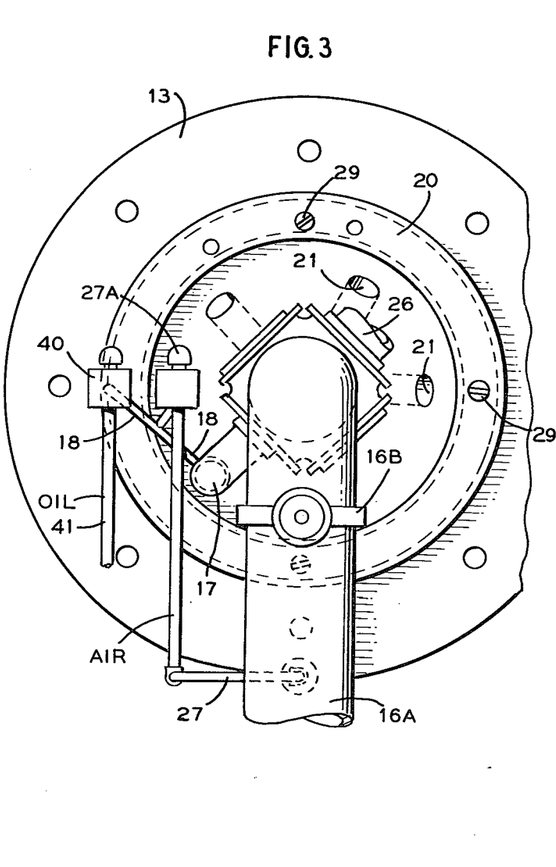
FIG. 3 is a rear end view of the burner construction of FIG. 1.

Referring to the drawings, there is shown in FIGS. 1 to 3 a burner construction 10 embodying the invention. It will be understood that the burner 10 has general utility and can be used in various applications which call for heating. However, as will be hereinafter described, the burner 10 has particular application for firing a boiler.

The burner 10 comprises a burner nozzle 11 which in the illustrated embodiment is formed of a ceramic block having a bore or chamber 12 which diverges from its inlet end 12A to outlet end 12B. The burner nozzle 11 is suitably connected or attached to a mounting plate or flange 13. Connected to the inlet end 12A of the nozzle is a mixing chamber fixture 14 into which combustion air is introduced through an air nozzle 15. The air conduit 16A connected to the air nozzle 15, it will be understood is connected to the outlet end of a blower (not shown). A suitable value 16B is disposed in the air conduit 16A for controlling the flow of combustion air. As shown, the air nozzle is disposed in axial alignment with the inlet 12A of the burner nozzle 12, and the arrangement is such that when combustion air is introduced into the mixing chamber, the velocity of the combustion air through the mixing chamber will create a zone of negative or reduced pressure.

Adjacent to the discharge or outlet end 12B of the burner is a gas return port 16. Connected to the gas port 16 is a return tube 17 which connects the gas port in communication with the mixing chamber 14. The arrangement is such that when the burner 10 is firing, the flow of combustion air through the mixing chamber 14 will induce a flow of a portion of the combustion gases through the gas port 16 and connected return tube 17 to the mixing chamber.

In accordance with this invention, a liquid fuel, e.g. a fuel oil, diesel oil or other suitable volatile liquid fuel is introduced into the gas return tube through a fuel feed line 18; the fuel inlet of which is disposed as close to the mounting flange as is practical. It is also preferred that the fuel inlet of line 18 be introduced into the return tube 17 from above.

The introduction of the liquid fuel into the return tube 17 during burner operation will result in the hot gaseous products of combustion heating the liquid fuel so that the fuel is quickly converted into its gaseous state by the time it enters the mixing chamber where the fuel in its gaseous state will mix with the incoming combustion air to form a generally homogeneous gaseous fuel mixture. It will be noted that since the combustion gases entering the return tube 17 is virtually devoid of any oxygen, that no combustion will occur within the return tube, and that the return tube during burner operation on liquid fuel will function as a gasification chamber in which the fuel is changed from its liquid to gaseous state.

Means for effecting fuel ignition is achieved by a starting or igniting burner 19. It will be understood that the igniter burner may be either oil or gas fired. As best seen in FIG. 1, the igniter burner is inclined at an angle to the longitudinal axis of the burner 10, and is directed or aimed at the return gas port 16. The specific location of the igniter burner 19 as described achieves two important functions. It is disposed out of alignment with respect to the flow of air and fuel mixture so as to not impede the air flow; and the arrangement is such that the initial gasification of the liquid fuel is enhanced as the procucts of combustion of the igniter burner quickly finds their way to the gas port 16 and return tube 17. It has been established that the direction of the igniter burner 19 toward the gas return port reduces the start up time of the burner 10 to less than 30 seconds when operating on oil.

In accordance with this invention, an air manifold chamber 20 is connected to the mounting flange 13. A plurality of conduits or passageways 21 extending through the burner block 11 connect the manifold chamber 20 in communication with a series of port openings 22. As shown the port openings 22 are circumferentially spaced about the outlet end 12B of the burner nozzle between the outer end of the nozzle and the gas return port 16. It will be understood that a suitable interchangeable air nozzle 22A may be disposed in the port openings 22. The arrangement of the port openings 22 and nozzle 22A therein is such that air is introduced in a generally tangential manner relative to the burner flame generated during combustion.

Air is fed to the manifold 20 from a bleed line 23 connected to the main air supply conduit 16A. The bleed line 23 may be provided with a suitable control valve 24 and pressure gauge 25 to control the air flow to the manifold 20 and associated ports 22.

The burner 10 described can also be fired by a gaseous fuel such as a natural or synthetic gas, or low pressure gas and the like by providing a gas inlet 26 through which a gas fuel is introduced into the mixing chamber when gas firing is desired. When oil is not being introduced into the return tube 17, e.g. when the burner 10 is operating only on gas, the return tube 17 is cooled by bleeding cooling air thereinto. Such cooling air is supplied by another air bleed branch 27 coming off the main supply. The air bleed branch 27 connects to the oil inlet 18 through which cooling air is introduced into the return tube when the burner is operating on gas only. A valve 28 is provided in bleed line 27 to control the flow of cooling air to the return tube for cooling when gas firing.

Referring to FIG. 1, the manifold 20 may be provided with spaced openings closed by plugs 29 which are disposed in alignment with the passageway or conduits 21 which connect the manifold 20 to a port 22. The openings closed by plugs 29 provide a means whereby one or more passageways 21 can be rendered inoperative. This can be attained by suitably closing one or more of the passageways 21, if desired, by means of the access provided by the opening closed by plug 29 opposite a given passageway 21.

Figure 6:
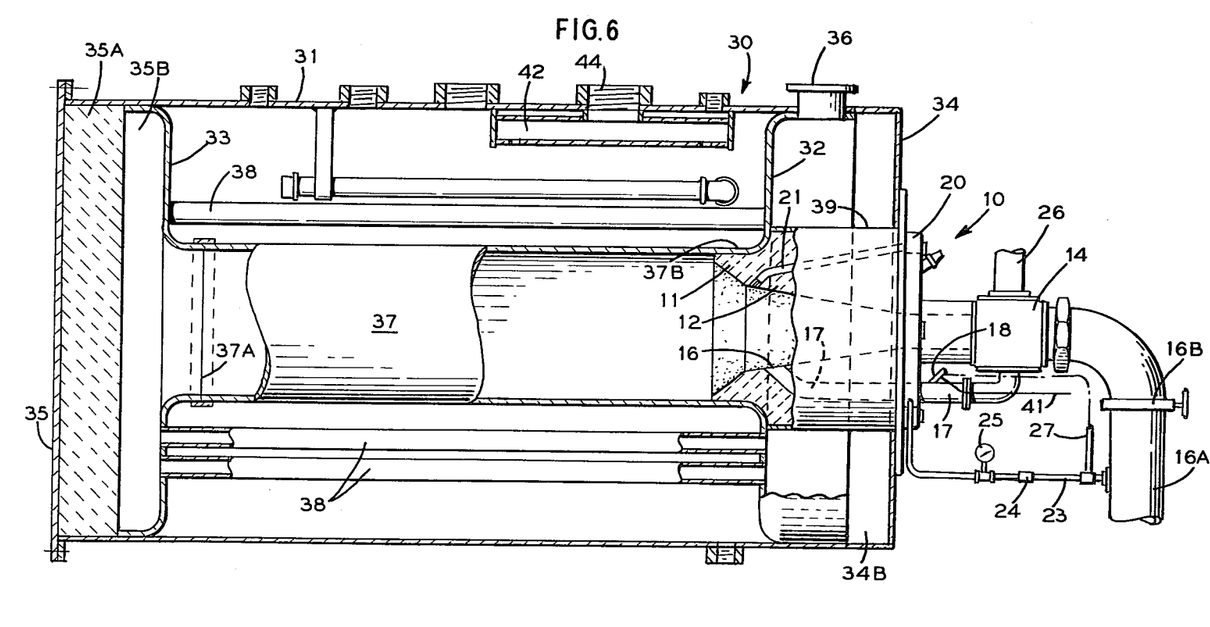
FIG. 6 is a sectional view of the burner-boiler combination embodying the present invention.

The burner 10 described in addition to having general utility is particularly suitable for firing a boiler. Referring to FIG. 6, the burner 10 is illustrated in combination with a boiler 30 which is particularly compatible with the burner to define a package unit which is capable of generating steam in approximately 5 minutes from a cold start; and which is capable of attaining a minimum of 86% thermal efficiency and results in a fuel savings of 20 to 40% over that of a comparable size boiler fired with conventional or known type oil burners.

The boiler 30 includes an outer cylindrical shell 31 which is interconnected between a pair of header end walls 32 and 33. End wall 35, lined with suitable refractory material 35A, is spaced from header wall 33 to define a plenum chamber 35B. The front end wall 34 is spaced from the header wall 32 to define a plenum chamber 34B, and need not require an insulating liner. Chamber or plenum 34B includes a vent 36 which connects to a suitable stack (not shown) which exhausts to the atmosphere.

Interconnected between the opposed header walls 32 and 33 is a fire tube 37, the rear end 37A of which is disposed in communication with plenum 35B. Circumferentially spaced about the fire tube 37 are a plurality of tubes 38 which are also interconnected between the header walls 32 and 33. In the illustrated embodiment the front wall 34 is provided with a burner opening 39 which is sized for receiving the burner 10 herein described. In accordance with this invention, the burner block 11 is sized and shaped so as to be disposed in fluid tight relationship with the front opening 37B of the fire tube 37. The arrangement is such that when the burner 10 is firing; the products of combustion are directed through the fire tube whereby the heat generated by the burner is transmitted to the fire tube by radiation and conduction and then to the surrounding water. The combustion gases eminating from the fire tube 37 to the rear plenum make a second pass through the tubes 38 and exhaust from the front plenum 34B to the connected stack. It will be understood that the boiler described includes a feed water means for introducing water into the boiler for maintaining the proper water lever, and that the boiler includes the necessary dry pipe means 42 for collecting the steam generated and for directing the steam to the steam outlet 44 for distribution to a point of use e.g. a radiator or a processing use.

Significant of the boiler construction described is that the boiler 30 when utilized with a burner 10 as described requires a minimum of heat transfer surface area. For example, a 40 B.H.P. rated boiler unit fired by conventional or known type of oil burners requires from 200 to 400 square feet of heat transfer surface. The boiler 30 as herein described with a like 40 B.H.P. rating and fired by burner 10, as described requires only 60 to 80 sq. feet of heat transfer surface. This substantial reduction in the amount of heat transfer surface required by the invention described herein is attributed to the diffusion burning effected by the burner and high surface velocity developed by the burner which results in an efficient transfer of heat to the heating surface of the boiler by both radiation and conduction.

Figure 4:
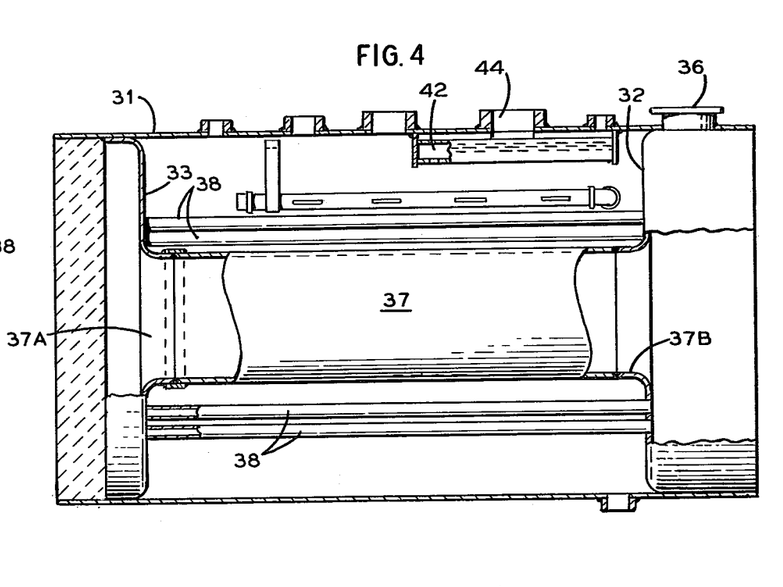
FIG. 4 is a section view of a boiler for use with the burner of FIGS. 1 to 3, with the end wall removed.
Figure 5:
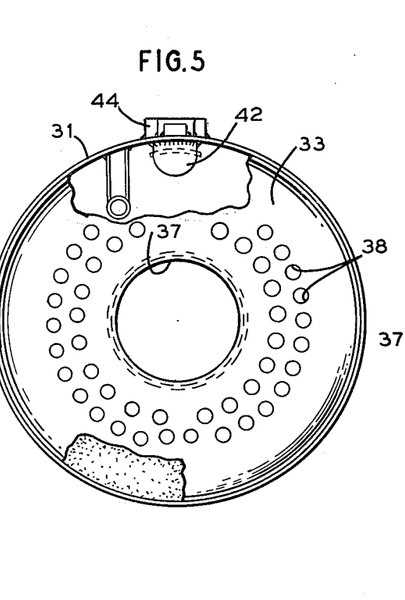
FIG. 5 is a left end view of FIG. 4; with the end wall removed.
Figure 7:
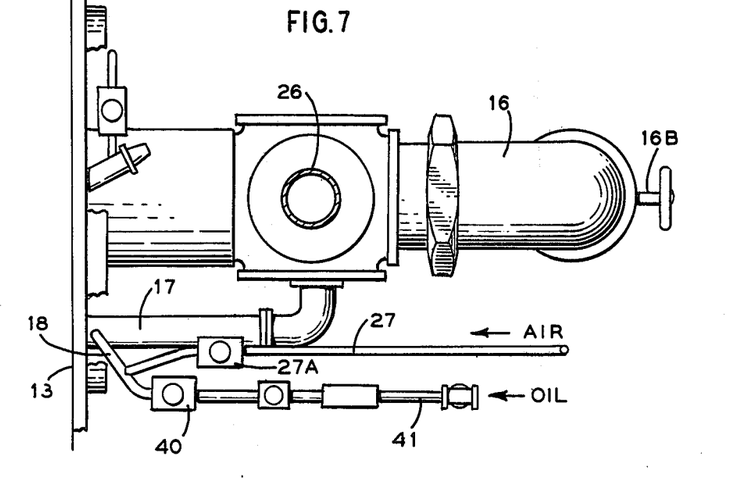
FIG. 7 is a fragmentary top plan view of the burner.
Figure 8:
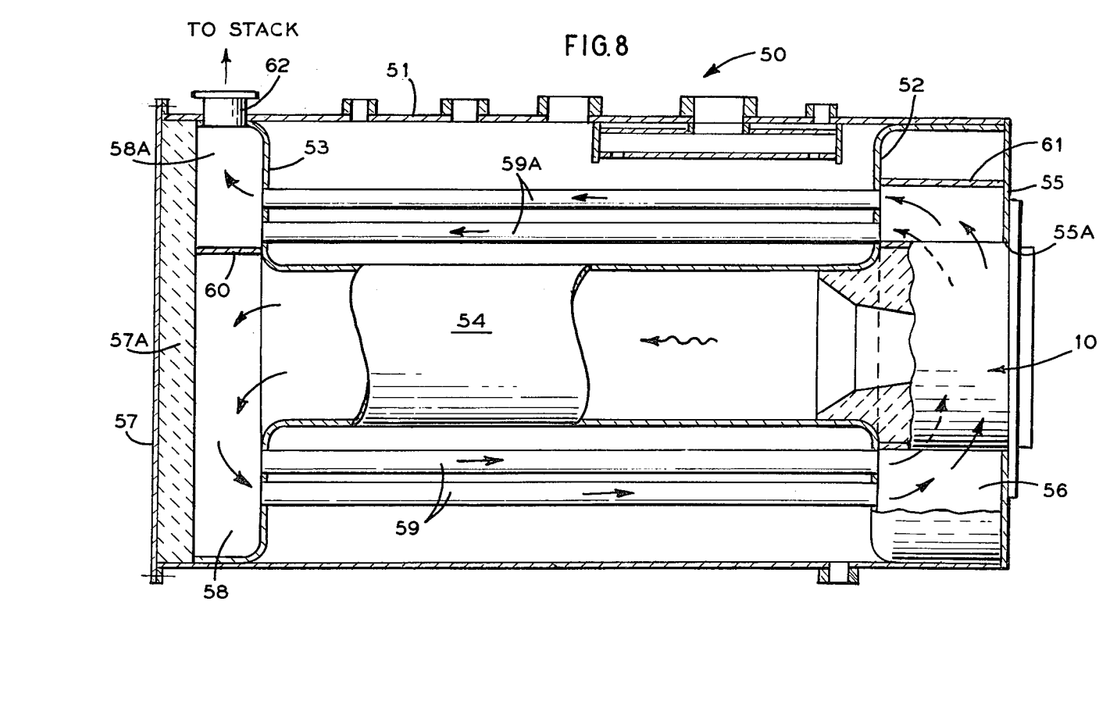
FIG. 8 is a fragmentary section of a modified burner boiler combination.

FIG. 7 illustrates a modified boiler construction. FIG. 7 discloses a boiler construction 50 similar to that of FIG. 4, 5, and 6, except the modified construction of FIG. 7 is a three pass boiler whereas the construction of FIGS. 4 to 6 is a two pass boiler.

As shown in FIG. 7 the boiler 50 comprises an outer boiler shell 51 closed by opposed end header walls 52 and 53. Interconnected between header walls 52 and 53 is the main fire tube 54. Spaced from header wall 51 in the front wall 55 which is provided with a burner opening 55A for receiving a burner 10 as hereinbefore described. The space between the front wall 55 and the front header wall 52 defines a plenum chamber 56. A rear wall 57 lined with refractory 57A is spaced from the rear header wall 53 to define a rear plenum chamber 58. Interconnected between header walls 52 and 51 are a plurality of tubes 59.

Extending transversely of the rear plenum chamber 58 is a baffle 60 which partitions the chamber so as to direct the gases exiting from the fire tube 54 below the baffle 60 to be directed through the lower tube 59 to define a second gas pass.

A baffle 61 extends transversely of the front chamber 56 for directing the gases exiting from the second pass tubes 59 to the upper tubes 59A to define a third gas pass. The gases exiting from the third pass exhaust to the chamber 58A defined above baffle 60 and which chamber 58A exhausts to vent or stack 62. In all other respects, the boiler 50 is similar to that herein before described.

The operation of the burner and boiler is as follows:

When operating on oil, at cold start the valve 19A controlling the flow of fuel to the igniter burner 19 is opened and burner 19 is ignited. It will be understood that the igniter burner 19 may be either oil or gas fired.

The arrangement and location of the igniter burner 19 is such that its hot products of combustion are directed toward the gas return port 16 so that the return tube is immediately functioning for returning hot products of combustion to the mixing chamber. With the hot products of combustion generated by this igniter burner flowing through the return tube 17, the valve 40 controlling the "run" oil is opened and the oil is introduced through inlet 18 into the return tube 17 where it is gasified by the heat of the combustion gases flowing therethrough. The gasified liquid fuel is then induced into the mixing chamber 14 where it is mixed with the combustion air which is being injected through nozzle 15 under pressure and controlled by valve 16A to form a generally homogeneous fuel gas and air combustible mixture. Due to the change of state of the fuel oil from a liquid to a gas prior to combustion, the amount of air injected through the air nozzle is controlled so that only the optimum amount of air needed for combustion is permitted to the mixing chamber. The gas-fuel mixture discharging through the burner nozzle is then ignited by the ignition burner 19. Once the main flame has been established, the burner 19 is turned off and the flame is rendered self perpetuating until the supply of fuel to inlet 18 is interrupted. The flame thus produced is a blue flame having a heat intensity sufficient to cause a break down of the hydrocarbons into its base elements e.g. hydrogen and carbon.

In accordance with this invention a portion of the air from the main supply 16A is bled through line 23 to the manifold chamber 20 from whence the slight amount of air i.e. less than 3% is distributed to a plurality of ports 22 spaced out the discharge end of the nozzle 12B. The air introduced through ports 22 imparts an action to the flame which functions to shorten, but maintain surface velocity thereof, and at the same time supplies the oxygen needed to effect the diffusion burning of the free hydrogen and carbon present. This diffusion burning thus provides the blue flame generated by the burner with a ring of hot illuminous gas which enhances the heat transfer of the hot products of combustion to the heat transfer surfaces of the boiler. The diffusion burning effected hereby permits heat to be transferred quickly and rapidly by both radiation and conduction. It has been discovered that due to the combustion capable of the described burner, that in a 40 B.H.P. rated boiler, steam can be generated from a cold start in approximately 5 minutes. As a result, the cycle time that the burner is required to operate to maintain the boiler at operating conditions is therefore materially reduced to result in substantial fuel savings. Fuel economy is further enhanced in that the combustion efficiency of the burner is vastly improved as the liquid fuel is being burned as a gas rather than a liquid which results in virtually all of the fuel being consumed. Because of the total combustion afforded by the described burner, the polutents resulting from the products of combustion are reduced to a minimum. Also the burning of liquid oil in its gaseous state reduces the formation of soot and carbon which would otherwise form on the heat transfer surface of the boiler. Thus the described boiler will require little if any cleaning and the thermal efficiency thereof can be maintained throughout its period of operation with a minimum of maintenance or cleaning.

By proportioning the amount of combustion air and diffusion air by control of valves 16B and 24, the intensity of the burner flame and/or luminousity of disfusion burning can be controlled over a wide range while maintaining the high surface velocity for optimum heat transfer.

The burner 10 described can also be fired solely by gas and/or in combination with liquid fuel. When gas firing only is desired, the valve 40 to the oil line 41 is turned off and the gas valve in the gas line 26 is opened. The gas fuel is directly introduced into the mixing chamber 14 through conduit 26 where it is mixed with air to form the gas-air combustible mixture and is ignited similar to that hereinbefore described. However, when gas only is being used as the main fuel, provision must be made to cool the return tube 17 to prevent burn out. This is attained by bleeding some cold air from the main air supply 16A into the return tube 17 through bleed line 27 to cool the return tube 17. The bleed line 27 connects to the oil inlet 18 whereby air is introduced into the return tube, when oil is not being used to cool the return tube 17. A suitable solenoid valve 27A is disposed in bleed line 27 to control the flow of cooling air to tube 17. It will be understood that air from the manifold is directed to the tangential ports 22 when gas is being fired through the burner 10 in a manner similar to that described with respect to the burner operating with liquid fuel.

From the foregoing description, it will be noted that the boiler can be fired by either a liquid fuel or gaseous fuel and/or simultaneously on both merely by the suitable control of the valves controlling the flow of the respective fuels to the burner. It will also be understood that suitable automatic control means can readily be adapted to the burner and/or boiler to effect fully automatic control thereof.

While the invention has been described with respect to several embodiments thereof, it will be appreciated and understood that variation and modification may be made without departing from the spirit or scope of the invention.

I claim:

1. A burner for burning a gasifiable liquid fuel comprising
    a burner nozzle having an inlet and an outlet,
    a mixing chamber connected in communication with said inlet;
    means for introducing combustion air into said mixing chamber under pressure whereby the velocity of the combustion air through said mixing chamber creates a zone of reduced pressure in said mixing chamber,
    said nozzle having a gas return port adjacent to the outlet of said nozzle, and
    a return tube interconnected between said gas return port and said mixing chamber whereby the zone of reduced pressure in said mixing chamber induces a flow of hot combustion gas through said gas return port and connected return tube to said mixing chamber,
    means for introducing a liquid fuel into said return tube whereby the hot gases of combustion effect the gasification of the liquid fuel prior to said fuel entering into said mixing chamber to mix with said air to form a combustible gaseous mixture;
    ignition means disposed relative to said nozzle to effect ignition of said combustible gaseous mixture, whereby a flame having a high flame velocity and very high flame temperature is achieved so as to cause a break down in a portion of the hydrocarbons into their basic elements hydrogen and carbon, and a means disposed adjacent to the outlet of said burner nozzle for directing an air stream in a generally tangential direction relative to the longitudinal axis of said nozzle and burner flame therein whereby said air stream effects the diffusion burning of the free hydrogen and carbon and the maintaining of said velocity.

2. A burner as defined in claim 1 wherein said last mentioned means are disposed between said burner outlet and said gas return port.

3. A burner as defined in claim 1 wherein said last mentioned means includes a plurality of ports circumferentially spaced about the outlet of said nozzle whereby said spaced ports are disposed generally tangential of said outlet; and an air manifold disposed about said nozzle, and a passageway interconnecting said manifold to each of said spaced ports; and means for supplying said manifold with air.

4. A burner as defined in claim 3 and including means for controlling the flow of air through one or more of said passageways.

5. In a burner for burning a gasifiable liquid fuel having a burner nozzle provided with an inlet and an outlet, a mixing chamber connected in communication with said inlet; means for introducing combustion air into said mixing chamber under pressure whereby the velocity of the combustion air through said chamber creates a zone of reduced pressure in said mixing chamber, a gas return port adjacent to the outlet of said nozzle, and a gas return tube connecting said return port to said mixing chamber, and means for introducing a liquid fuel into said return tube whereby the hot gases of combustion effects a gasification of the liquid fuel prior to entering said mixing chamber to form a combustible gaseous fuel mixture, the improvement of an igniting means for igniting said gaseous fuel mixture, said igniting means being disposed at an angle relative to the axis of said nozzle, and said igniting means being generally directed toward the gas return port.

6. The burner as defined in claim 5 wherein said igniting means comprises a fuel burner; said fuel burner being angled toward said gas return port so that the products of combustion of said fuel burner are utilized to rapidly initiate the gasification of the liquid fuel introduced in said return tube.

7. The burner as defined in claim 6 wherein said fuel burner comprises a gas burner.

8. The burner as defined in claim 6 wherein the fuel burner comprises a liquid fuel burner.

9. The burner as defined in claim 5 including a plurality of port circumferentially spaced about said outlet, an air manifold, a passageways interconnected between each of said plurality of ports and said air manifold; said plurality of ports being disposed between said outlet and said gas return port, and means for introducing air into said manifold and connected plurality of ports whereby air discharging through said plurality of ports effects the diffusion burning of the free hydrogen and carbon in the flame.

10. The burner as defined in claim 6 wherein said burner is disposed downstreamwise of said mixing chamber so as to provide an unimpeded air flow through said mixing chamber.

11. The burner as defined in claim 9 and including interchangeable nozzles for controlling the flow of air through said plurality of ports.

12. A burner as defined in claim 5 in combination with a boiler.

13. A boiler capable of generating steam or hot water in a matter of a few minutes from a cold start comprising a boiler shell having a pair of spaced apart end header walls and an end wall spaced from the respective header walls so as to define a plenum between each of said header wall and adjacent end wall,
 a fire tube interconnected between said header walls, and a burner means firing into said fire tube,
 said burner means including a burner nozzle disposed in fluid tight sealing relationship with said fire tube,
 said nozzle having an inlet and an outlet,
 a mixing chamber in communication with said inlet, means for introducing combustion air into said mixing chamber under pressure whereby the velocity of the air creates a zone of reduced pressure in said mixing chamber,
 said nozzle having a gas return port, a return tube interconnecting said return port to said mixing chamber, whereby the zone of reduced pressure in said mixing chamber induces a flow of hot combustion gases through said gas return port and connected return tube to said mixing chamber,
 means for introducing a liquid fuel into said return tube whereby the hot gases of combustion effect the gasification of said liquid fuel prior to mixing with the combustion air in the mixing chamber to form a combustible gaseous fuel-air mixture
 means disposed about the outlet of said burner nozzle for directing a stream of air about said outlet in a generally tangential direction relative to the axis of the burner nozzle whereby said stream of air effects the diffusion burning of the free hydrogen and carbon in the flame to generate an illuminous flame to transmit heat by both radiation and conduction to the fire tube so as to maximize heat transfer to the boiler water, and
 an ignition means for igniting the gaseous fuel-air mixture.

14. A boiler as defined in claim 13 wherein said ignition means comprises a burner igniter disposed at an angle to the axis of the burner nozzle, said burner igniter being directed toward said gas return port to quickly initiate the flow of hot products of combustion through said gas return port.

15. A boiler as defined in claim 13 and including a plurality of tubes interconnected between said header wall and circumferentially spaced about said fire tube, said tubes defining a second gas pass whereby the gases passing therethrough are discharged into an adjacent plenum for exhausting to atmosphere.

16. A boiler as defined in claim 15 and including a second series of tubes spaced about said fire tubes, said second series of tubes defining a third gas pass whereby the gases passing through said second series of tubes are exhausted to atmosphere.

17. A compact burner-boiler combination having an improved heating cycle for effecting substantial fuel savings and capable of being fired alternately and/or simultaneously with a gaseous and/or liquid fuel comprising a boiler shell, a pair of spaced apart header walls connected to said boiler shell, and an end wall spaced from each of said header walls to define a plenum between each said end wall and its adjacent header wall,
 a fire tube interconnected between said header walls,
 a plurality of tubes interconnected between said header walls,
 one of said end walls having a burner opening; a combination gas and oil burner mounted in said burner opening, said burner having a nozzle disposed in fluid-tight sealing relationship with said fire tube, and said nozzle having an inlet end and an outlet end, said outlet end being disposed in said fire tube, a fuel air mixing chamber disposed in communication with said nozzle inlet, means for introducing air under pressure into said mixing chamber; a gas return port disposed adjacent to the nozzle outlet, a return tube interconnecting said gas return port to said mixing chamber, means for introducing a liquid fuel into said return tube whereby the hot gases of combustion effect a gasification of the liquid fuel prior to entering into said mixing chamber; means for introducing an alternate gaseous fuel into said mixing chamber; an igniting burner nozzle whereby said igniting burner is directed toward said gas return port whereby the products of combustion of said igniting burner effect the initial gasification of said liquid fuel, and a means for effecting a burner flame velocity and diffusion flame pattern for enhancing the transmission of heat energy to said fire tube both by radiation and conduction.

18. A compact burner-boiler combination as defined in claim 17 wherein said last mentioned means comprises a plurality of ports circumferentially spaced about the outlet of said burner nozzle, an air manifold, and a plurality of passageways interconnecting said plurality of ports to said manifold, said ports being arranged to introduce air in a generally tangential direction relative to the axis of said burner nozzle whereby said air effects the diffusion burning of the free hydrogen and carbon in the flame and functions to shorten the flame pattern and maintain surface velocity to effect a maximum transfer of heat energy by both radiation and conduction.

19. A burner-boiler combination as defined in claim 18 and including means for introducing cooling air into said return tube when said burner is being fired by a gas only being introduced into said mixing chamber through said alternate fuel means.

20. A burner-boiler combination as defined in claim 16 and including a second series of tubes interconnected between said header walls; said second series of tubes defines a third set of heat transfer surfaces.

* * * * *